June 24, 1941. R. H. LAWSON 2,247,245
STRAND FEED-CONTROLLING MECHANISM FOR TEXTILE AND OTHER MACHINES
Filed Jan. 24, 1940 10 Sheets-Sheet 1

Inventor:
Robert H. Lawson,
by Emery, Booth, Townsend, Miller and Weidner Attys

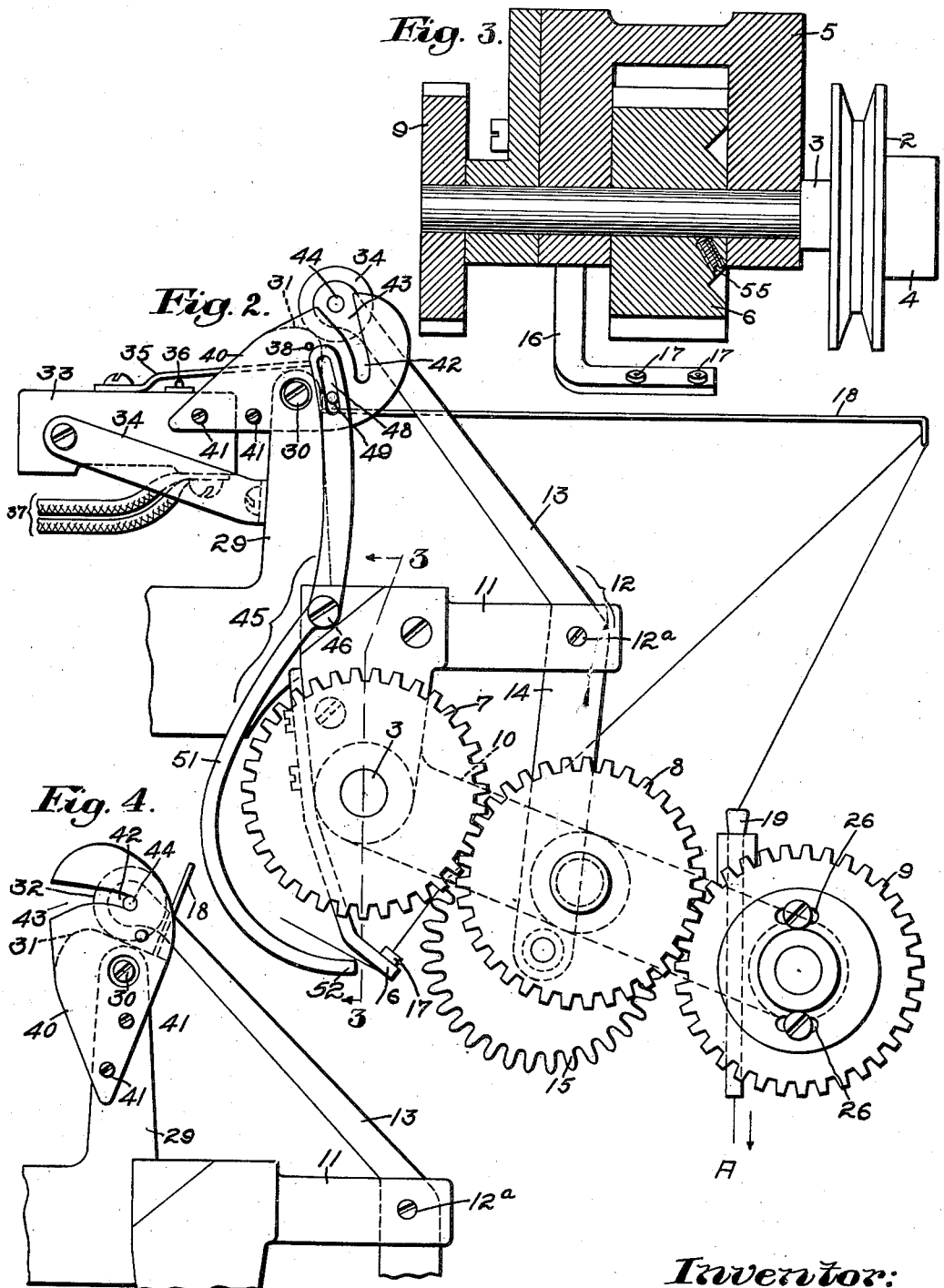

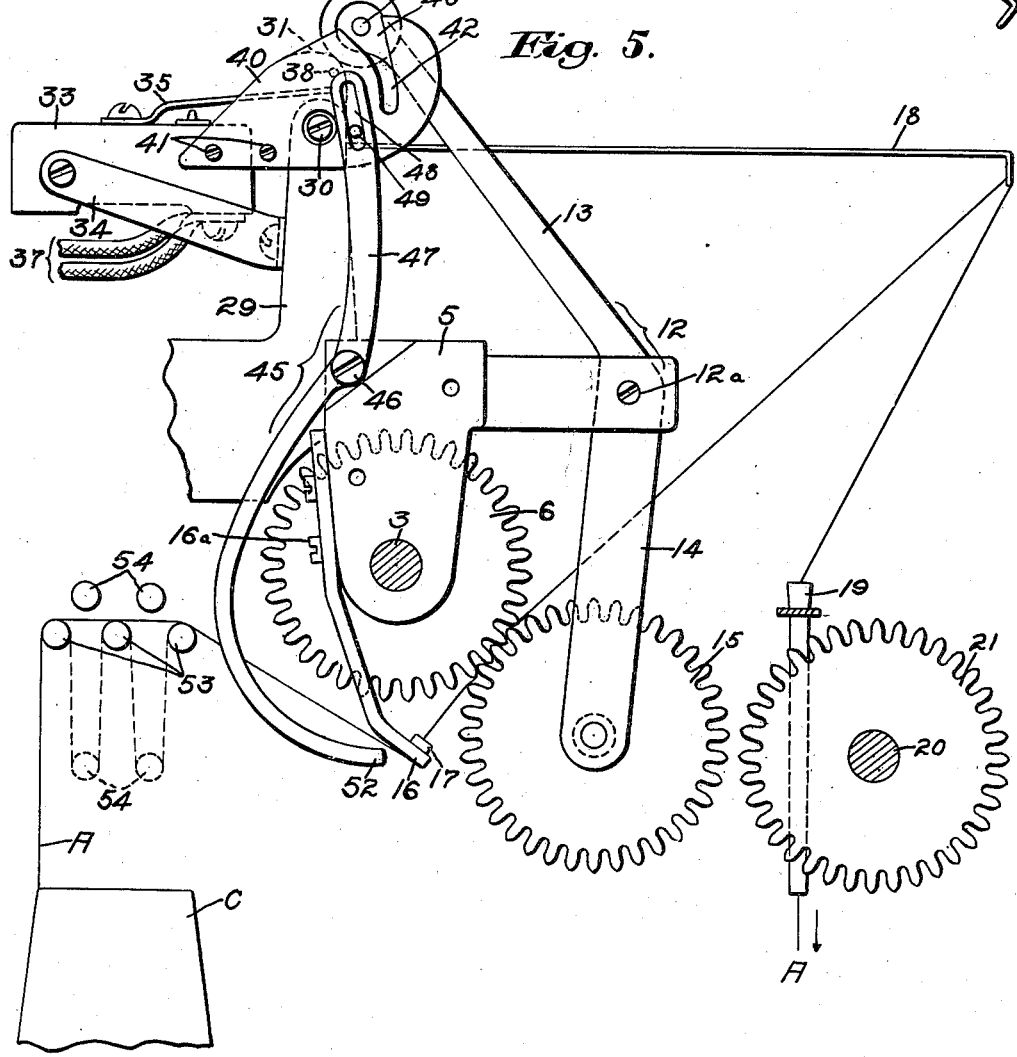

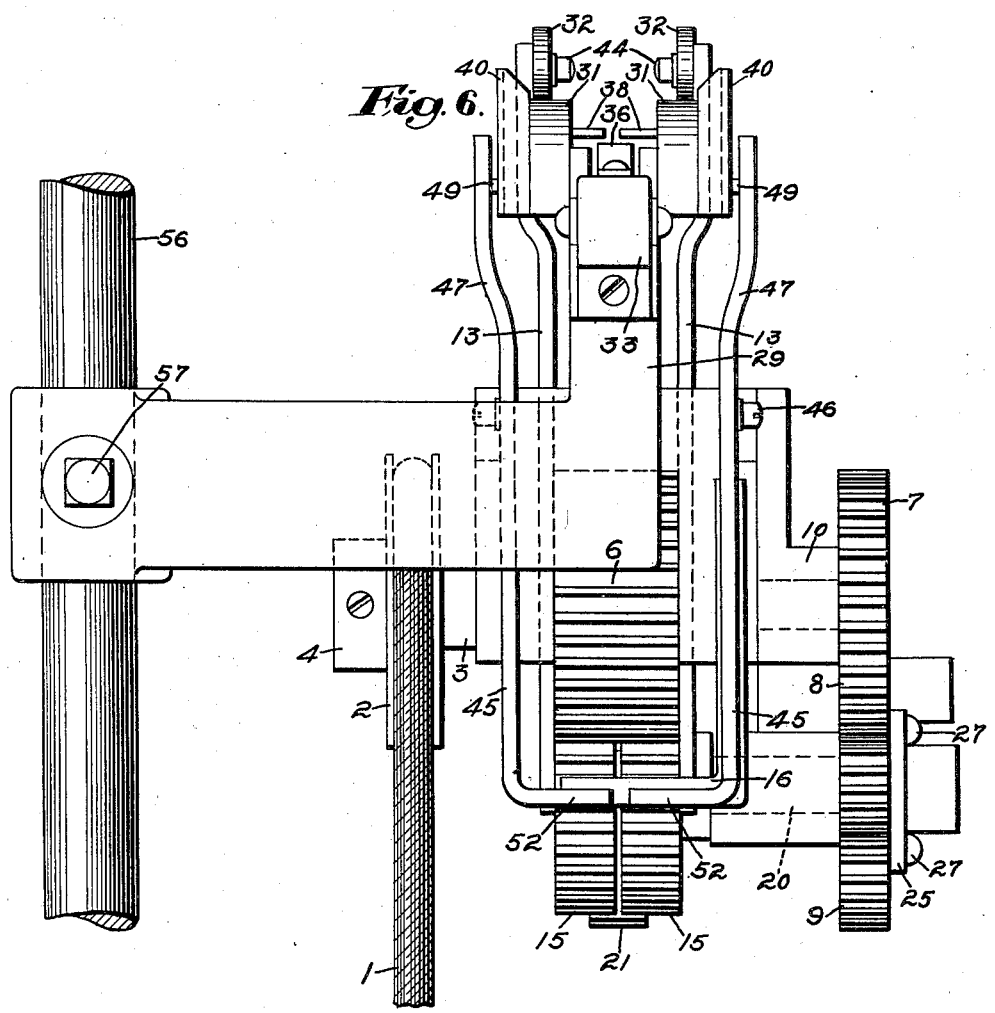

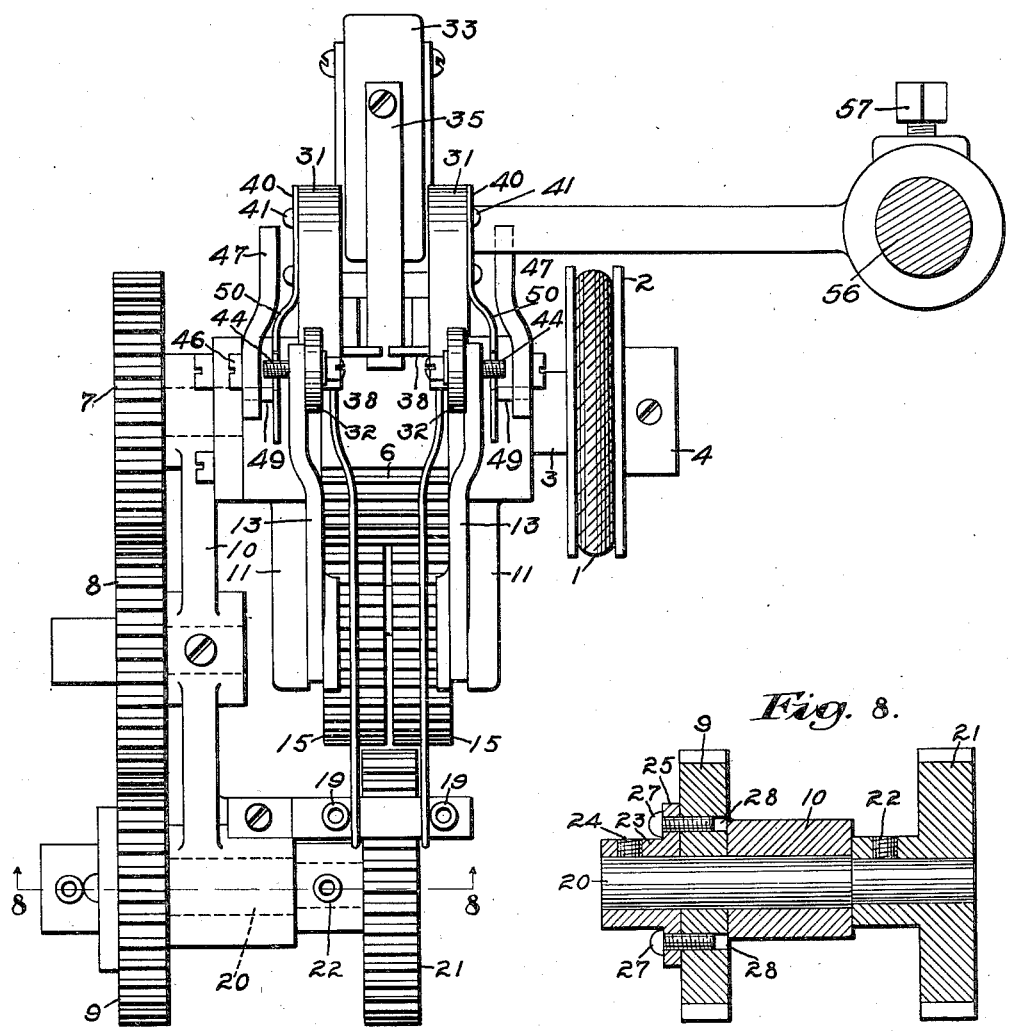

June 24, 1941.  R. H. LAWSON  2,247,245
STRAND FEED-CONTROLLING MECHANISM FOR TEXTILE AND OTHER MACHINES
Filed Jan. 24, 1940  10 Sheets-Sheet 6
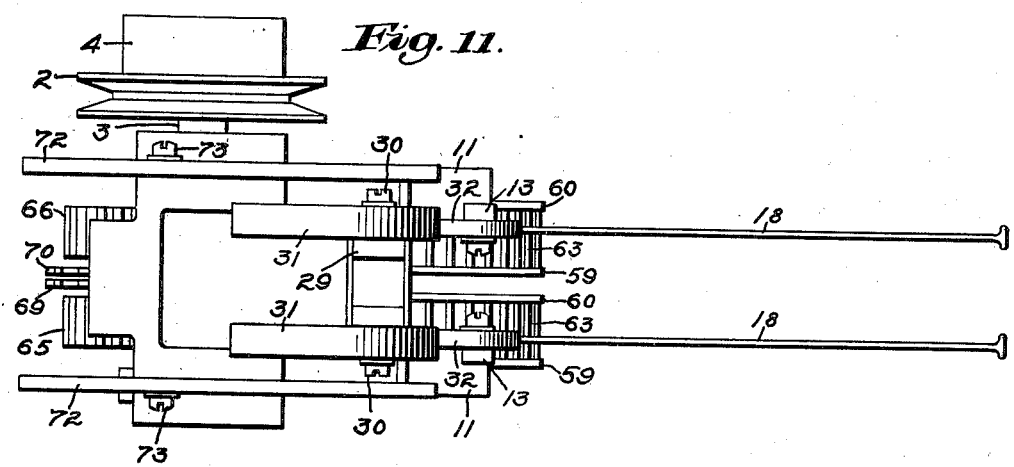
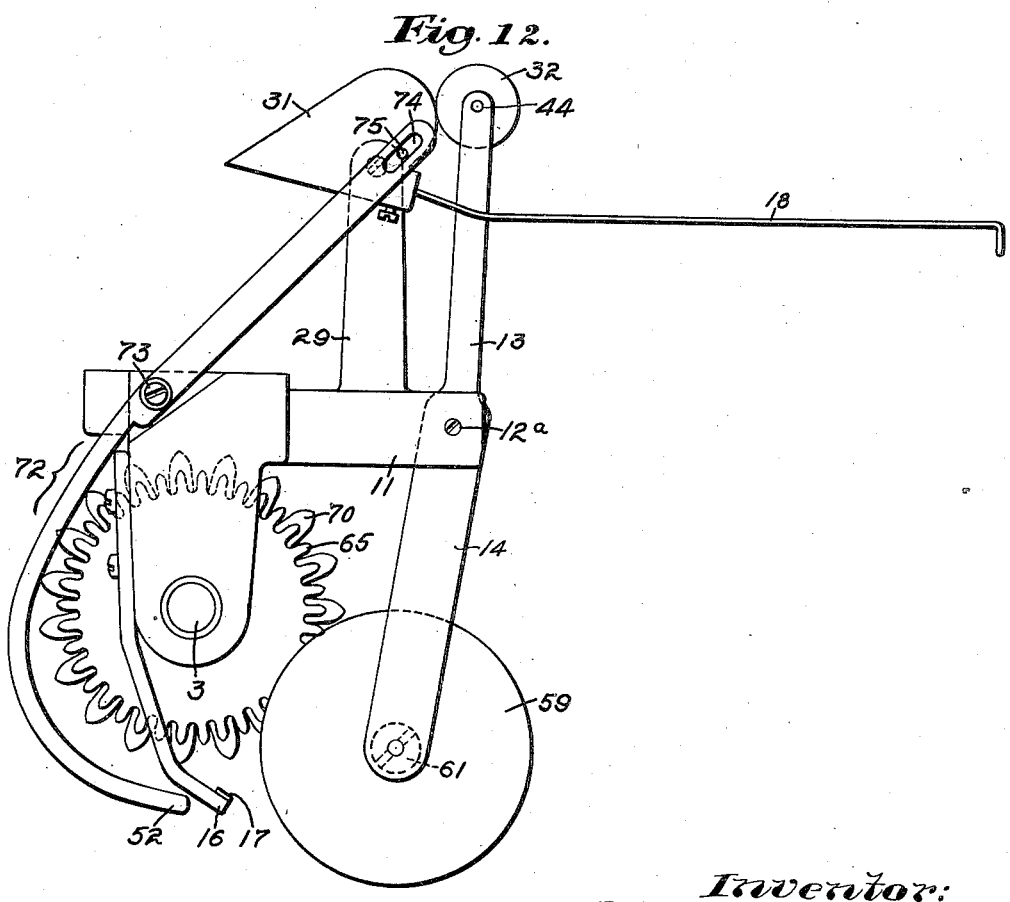
Inventor:
Robert H. Lawson, June 24, 1941.  R. H. LAWSON  2,247,245
STRAND FEED-CONTROLLING MECHANISM FOR TEXTILE AND OTHER MACHINES
Filed Jan. 24, 1940  10 Sheets-Sheet 7

Inventor:
Robert H. Lawson,
by Emery, Booth, Townsend, Miller and Newbury
Attys.

June 24, 1941.   R. H. LAWSON   2,247,245
STRAND FEED-CONTROLLING MECHANISM FOR TEXTILE AND OTHER MACHINES
Filed Jan. 24, 1940   10 Sheets-Sheet 8
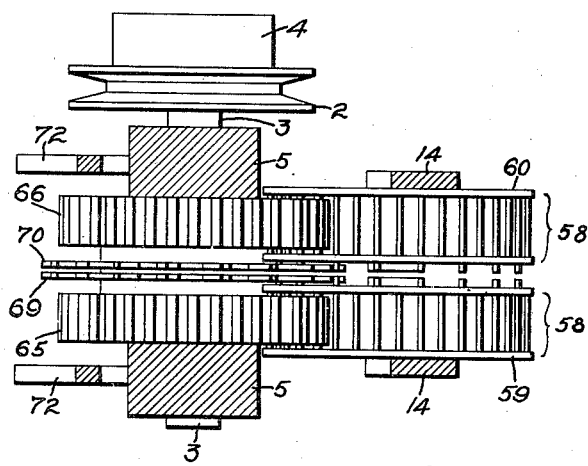
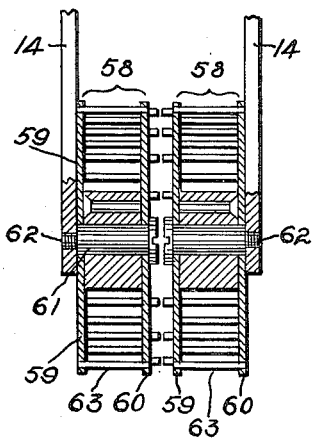
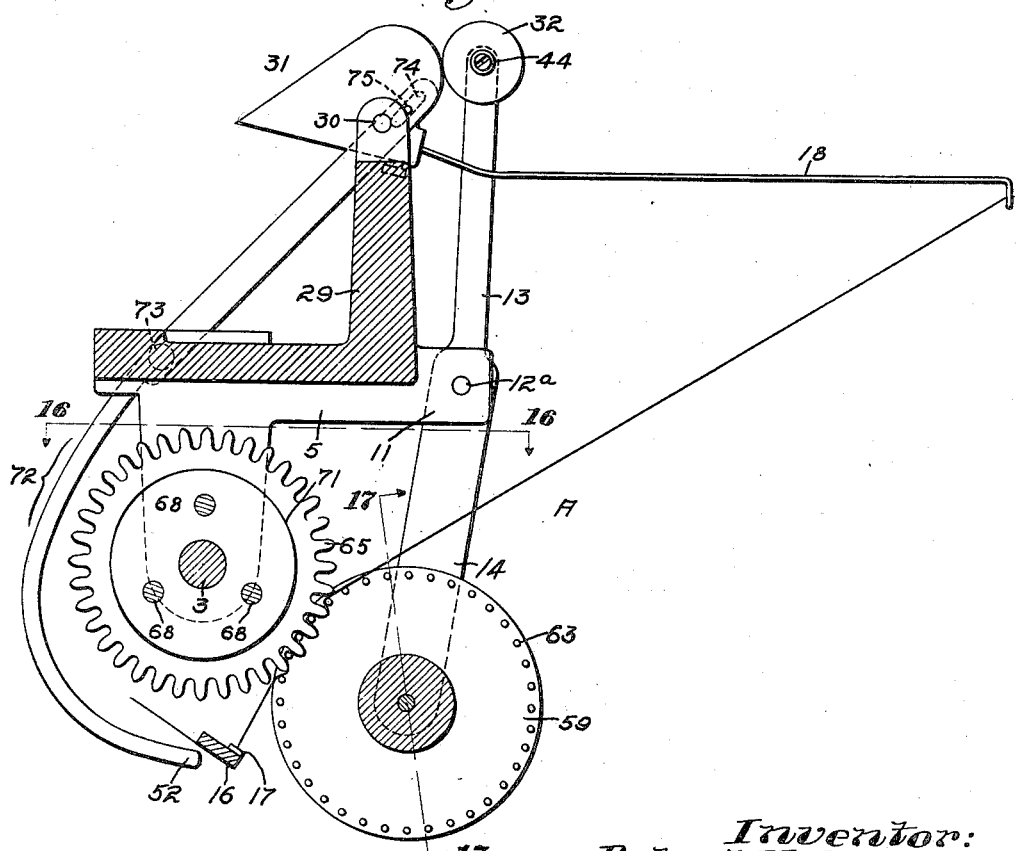
Inventor:
Robert H. Lawson.
by Emery, Booth, Townsend, Miller and Nichols
Attys.

June 24, 1941.    R. H. LAWSON    2,247,245
STRAND FEED-CONTROLLING MECHANISM FOR TEXTILE AND OTHER MACHINES
Filed Jan. 24, 1940    10 Sheets-Sheet 9
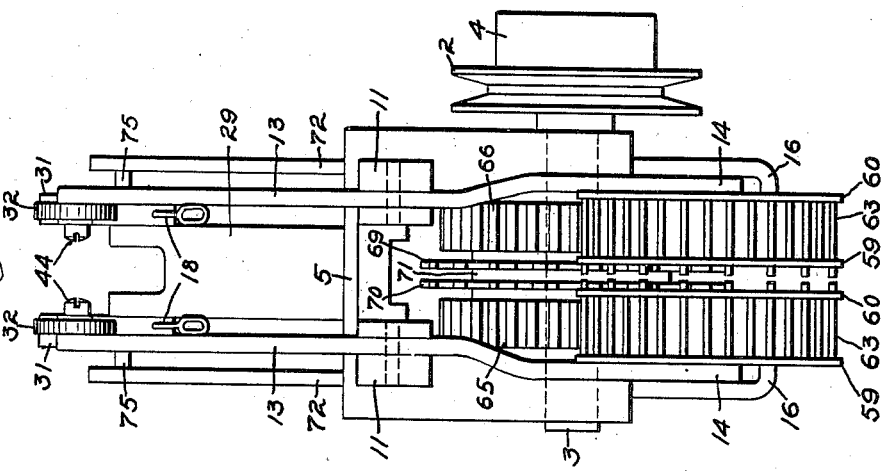
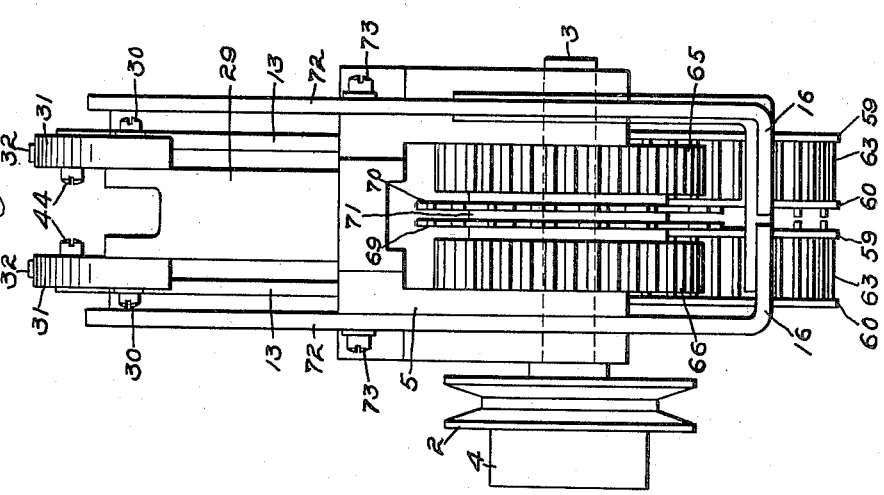
Inventor:
Robert H. Lawson,
by Emery Booth, Townsend, Miller and Luchting
Attys.

June 24, 1941.  R. H. LAWSON  2,247,245
STRAND FEED-CONTROLLING MECHANISM FOR TEXTILE AND OTHER MACHINES
Filed Jan. 24, 1940  10 Sheets-Sheet 10

Inventor:
Robert H Lawson,
by Emery, Booth, Townsend, Miller and Neisham  Attys

Patented June 24, 1941

2,247,245

UNITED STATES PATENT OFFICE 2,247,245

STRAND FEED-CONTROLLING MECHANISM FOR TEXTILE AND OTHER MACHINES

Robert H. Lawson, Pawtucket, R. I., assignor to Lawson Products, Incorporated, Pawtucket, R. I., a corporation of Rhode Island Application January 24, 1940, Serial No. 315,391

46 Claims. (Cl. 66—132)

This invention relates to strand feed-controlling mechanism for textile and other suitable machines, and particularly to mechanism for controlling the feed of yarn, thread or other strands to the needles of knitting machines, and while retaining the fundamental features disclosed in my pending application Ser. No. 281,547, filed June 28, 1939, as to which it is a continuation in part, it presents certain important improvements thereover.

In order that the principle of the invention may be readily understood, I have disclosed two embodiments thereof in the accompanying drawings, which embodiments are selected out of very numerous forms or types of my invention, and which two embodiments are merely examples of numerous embodiments that might be illustrated.

In said drawings,—

Fig. 2 is a side elevation of the construction shown in Fig. 1 and represents the strands as both being fed to the mechanism;

Fig. 3 is a vertical section upon the line 3—3 of Fig. 2;

Fig. 4 is a detail in side elevation of the upper part of the construction shown in Fig. 2, but represents the steadying, retaining or holding means to prevent the feeding gear that is out of feeding relation, from trembling or like movement, and which I also refer to as locking means for such gear or gears;

Fig. 5 is a side elevation similar to Fig. 2 but with the motion-transmitting gears removed to show the relation of the feeding gears and the motion-maintaining gears, and showing also strand-storing means;

Fig. 6 is a rear elevation of the construction shown in Fig. 1;

Fig. 7 is a plan view of the construction shown in Fig. 1;

Fig. 8 is a detail in transverse section on the line 8—8 of Fig. 7, and shows one form of means for adjusting certain gears in a circumferential direction;

Figs. 9 and 10 are details in side elevation of one form of stopping means in two different stopping positions;

Fig. 11 is a plan view of a second embodiment of my invention, showing the feeding of two strands only;

Fig. 12 is a side elevation of the construction shown in Fig. 11, and representing the strand-clamp for an inactive strand as in non-clamping position, both strands being therefore in feeding relation;

Fig. 15 is a view generally similar to Fig. 13 but showing the strands in feeding relation;

Fig. 16 is a horizontal section on the line 16—16 of Fig. 15;

Fig. 17 is a vertical section on the line 17—17, Fig. 15;

Fig. 18 is a rear elevation of the construction shown in Figs. 11 and 12;

Fig. 19 is a front elevation thereof; and

The herein disclosed strand feed-controlling mechanism for textile and other machines is particularly adapted for use in controlling the feed of one or more strands to the needles of knitting machines, and such strands may be fed in any desired relation and for the making of many different types of knitted fabrics, or, if used in relations other than knitting, the strand or strands will be handled or manipulated in accordance with the purposes of the mechanisms to which the strands are fed.

Without in any respect confining myself thereto, and the use being selected merely by way of a single but preferred example, I will describe the feed-controlling mechanism as though the strand or strands were being fed to the needles of a knitting machine, whether of a rotary character or otherwise, and without any limitation as to the character of the knitted fabric.

In my said co-pending application Ser. No. 281,547, I have disclosed strand feed-controlling mechanism including a set of rotary, toothed, interengaging gears or members for feeding a strand or strands between them, one of said gears or members being driven, and the other gear or member being movable into and out of meshing or strand-feeding relation thereto. Such mechanism is also herein disclosed as a basic feature of the present invention, but in addition there is herein disclosed among other features what I may term a motion-maintaining gear or member, preferably toothed, that is driven at the same speed as the driven gear of the strand-feeding gears, and is so positioned that when the movable feeding gear is moved out of mesh or feeding relation with the said driven gear, the said movable gear is instantly brought into mesh with said motion-maintaining gear, so that the proper speed of said movable gear is maintained while it is out of strand-feeding position, and so that when it is moved back into strand-feeding position or relation, it is traveling at the proper circumferential speed.

Other features of the present invention will be fully disclosed in the ensuing description.

Figure 20:
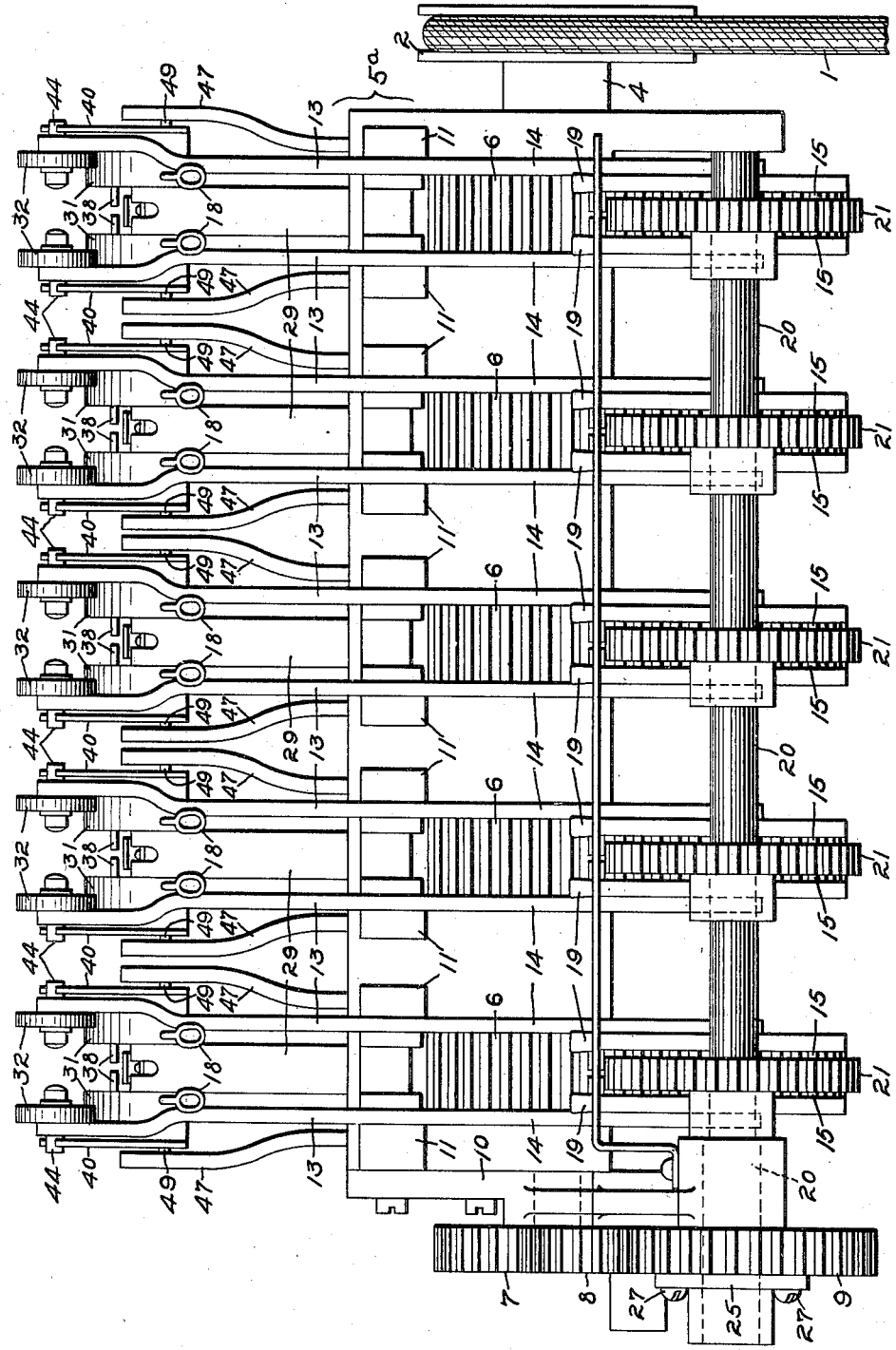
Fig. 20 is a front elevation showing five sets of feeding gearing in one assembly or unit to control the feeding of ten strands, the type of gearing being that shown in Figs. 1 to 10.

In Figs. 1 to 10, there is shown the first embodiment of the invention, illustrating one type of gearing, and for convenience there is shown in said embodiment the feeding of two strands only, although it is to be understood that any desired number of strands may be fed by the mechanism of either type. In Fig. 20, the same embodiment is disclosed as in Figs. 1 to 10, but therein I have represented the feeding of ten different strands all by the one assembly or unit, and it is to be understood that any number of strands from one to ten may be fed by a single unit or if desired a greater number of strands may be fed by a unit. Preferably, however, if the machine, as, for example, a so-called body knitting machine, is provided with, say, twenty threads, I provide two units each controlling the feeding of ten threads or strands. Obviously within the scope and purpose of the invention, any desired number of strands may be fed by a single unit.

In Figs. 11 to 19, I have represented the second embodiment of my invention wherein a somewhat different type of gearing is employed, and wherein the rotation of the movable feeding gear when not in feeding relation to the driven gear is maintained in a different manner.

Although only two types of gearing are herein represented, it is to be understood that a very great number of types of gearing may be employed in the practice of my invention and within the scope thereof. To illustrate all of them, or even more than those herein illustrated, would involve an excessive and undue number of drawings. Therefore, the restriction of the illustration to two embodiments only, must in no sense be taken as a restriction or limitation upon the scope of the invention, inasmuch as the principle of my invention may be practised in many different ways and by various mechanisms, all within the scope of my invention.

The mechanism, which is composed of comparatively few and light parts compactly assembled, may be mounted at any suitable position upon the machine in question, as, for example, upon a stationary part of a circular knitting machine, such as a hosiery machine or a body machine.

Figure 1:
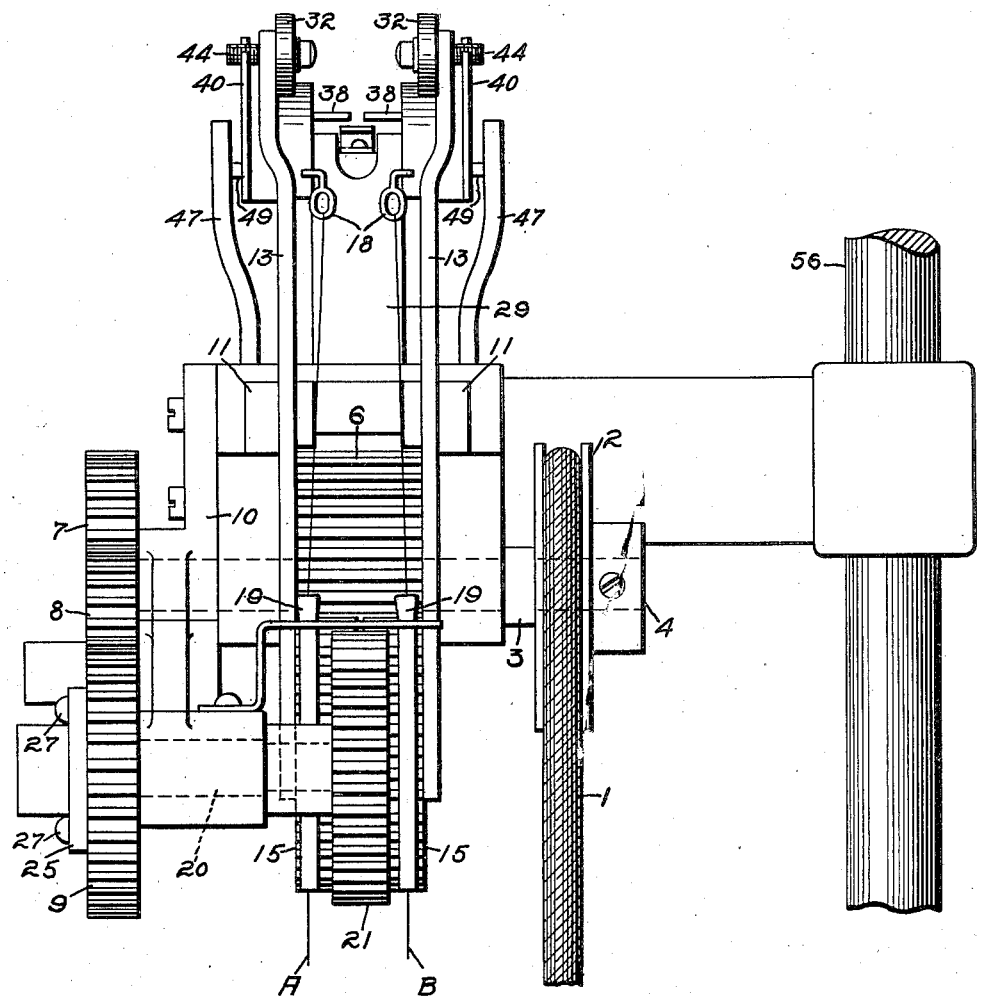
Fig. 1 is a front elevation of the preferred embodiment and represents the feeding of two strands only, desirably to the needles of a knitting machine.

Power is taken for the strand feed-controlling mechanism desirably from the driving means of the knitting machine or other mechanism to which my invention is applied. In Figs. 1, 6 and 7, I have represented a band or rope 1 by which power is taken from a rotating part of the knitting machine and is conveyed to the pulley or sheave 2 fast upon a shaft 3 mounted in suitable bearings, one of which is indicated at 4. The pulley or sheave 2 may be formed with a plurality of grooves for receiving the power conveying element. Inasmuch as the mechanism is to be stopped quickly in event of strand-breakage, I find it preferable to use a drive such as illustrated, permitting a slippage of parts without shock or jar, such as would occur with the use of meshing gears. Any suitable drive may, however, be employed. The bearing or bearings, such as 4, is or are mounted in a suitable bracket, casting or like part, composite or otherwise, indicated at 5 in the several figures. Fast upon shaft 3 is a toothed wheel or rotary member 6, which I herein term the driven feeding member or gear and which, as shown in Fig. 1, is of sufficient width to feed two separated strands indicated at A and B, but which may be of sufficient width to feed more than two strands, or only one strand. Also fast upon shaft 3, preferably at the outer end thereof opposite the sheave or pulley 2, is a toothed wheel or gear 7. It is to be understood that the two gears 6 and 7 travel at precisely the same angular speed, and gear 7 may be of any diameter and number of teeth within such requirement. Preferably gear 6 is of metal, but it is not necessary that gear 7 and the other gears of that driving train be of metal, and indeed I prefer some light non-metallic material such as fibre for the gear 7 and the other two gears of that train, namely, idler gear 8 meshing therewith and gear 9 meshing with gear 8. Said gears 8 and 9 are suitably mounted in the casting or part whereon the driven feed gear 6 is mounted. The said gears 7 and 9 must be in the same ratio to each other as the feed gear 6 and motion maintaining gear 21 (to be descriptively referred to) are to each other. The idler gear 8 (to be descriptively referred to) may be of any convenient diameter. As shown in dotted lines in Fig. 2, the casting or part thereof in which gears 8 and 9 are supported is an elongated downwardly inclined structure 10. Laterally extending from and constituting, if desired, an integral part thereof or a part that may be adjusted relative thereto, is a two-part or forked member 11 for the reception by the said two parallel arms thereof respectively, of levers 12, 12, pivoted at 12a, 12a upon the arms 11 respectively.

Each of said levers 12 has an upper arm 13 and a lower arm 14. Upon the lower end of each arm 14 is loosely mounted a toothed wheel, gear or rotary member 15, which I herein refer to as the co-acting feeding gear or co-acting feeding member, and which, in the herein disclosed embodiments of my invention (to which, however, I am not limited), is not driven, except through its meshing relation with the feeding gear 6 (though its motion is maintained from a gear to be described). The teeth of each wheel or gear 15 are similar in general form to the teeth of rotary gear or member 6, and desirably gears 15 are of the same material as rotary gear 6, being preferably metallic.

It is not necessary that the gear or gears 15 be of the same diameter or number of teeth as gear 6, or as the motion-maintaining gear yet to be described, but it is essential that as to circumferential speed, said motion maintaining gear must be identical with gear 6. Also gears 7 and 9 must be in the same ratio to each other as the feed gear 6 and the said motion maintaining gear are to each other.

As shown, the gears or rotary members 15 are mounted side by side in slightly spaced relation, so as both to have an interengaging relation with the teeth of the rotary gear or member 6. If more than two strands are to be fed to the same point, a corresponding number of lever arms 12 would be provided, and if only one strand is to be fed to the same point a single lever arm 12 is provided. For convenience I have shown the feeding of two strands in the construction represented in Figs. 1 to 10, but this is for illustratrative purposes only and does not constitute a limitation of my invention.

It will be noted, viewing the several figures, and particularly Figs. 2 and 5, that each toothed gear or rotary member 15 is so supported by the lever 12 pertaining thereto from its pivot 12a, which is directly above the toothed gear 15, that each toothed gear or rotary member 15 has in action a very sensitive pendulum-like action or movement upon its pivotal point of suspension at 12a, each such gear or rotary member 15 having, by reason of the lever 12 thereof, a capacity to respond entirely freely and unrestrainedly to the stress of the strand or strands. Of course, when there is absolutely no variation in the stress of the strand, there is no swinging movement of the lever 12, but each lever 12 is entirely free to respond to any change in stress of the strand, as obviously the movement up or down of an arm 18 moves the corresponding cam 31, and the lever 12 is entirely free to follow that movement of the cam 31. The said pivot 12a is a suitable horizontal pin or stud-shaft located in the two armed part 11 extending from the bracket 5, the position of said arms 11 being carefully established for the purpose. While the arms 11 are shown as integral with the main part 5 of the casting, it is to be understood that each arm 11 may be structurally distinct from the part 5 but connected thereto, and that any suitable means may be provided so as to adjust or position the arms 11, or the pivotal support therefor, that a very delicate pendulum-like movement is afforded each lever 12.

Assuming that two strands A, B are to be fed to the needles of the knitting machine, as, for example, to a circular hosiery machine, they are led from any suitable source or sources, as, for example, from a series of bobbins, one of which is indicated at C in Fig. 5. Each strand, as shown, for example, the strand A, Fig. 5, passes to a fixed strand-receiving guide arm 16 secured at 16a to the casting or bracket 5 having an eye 17, and then continues upward to a movable guide arm 18 to be hereinafter more fully referred to, and then from the eye thereof downwardly to a suitably supported guide tube or part 19 and thence to the needles of the knitting machine. Between the stationary guide arm 16 and the movable guide arm 18, the strand passes sinuously between the teeth of the feeding gears 6 and 15, as will be referred to in greater detail. As shown in Fig. 5, the strand, after passing from the supply 6, passes through strand-storing means, which will hereinafter be described in detail.

I have thus far referred not only to the feeding gears 6 and 15, between which the strand is fed, but I have also referred to the driving train of gears 7, 8, 9, the gears 6 and 7 being co-axial and shown as of the same diameter and number of teeth, but not necessarily so, as already stated. The gear 8 is an idler. The gear 9 of the said driving train, as is best understood by reference to Figs. 2 and 5, is fast upon a shaft 20 supported in or from the casting or bracket 5, and preferably in the outer end of the part 10, best shown in dotted lines in Fig. 2. Also fast upon the said shaft 20 is a gear 21 which, as best shown in Fig. 7, is so positioned and of such width that it may be engaged by either, or it may be both, of the gears 15 when either such gear 15 is swung upon its lever 12 out of meshing relation with the driven gear 6. The said gear 21 is preferably metallic, and it is shown as of the same diameter as each of the gears 15 and the gear 6, and is driven at the same speed as the gear 6 through the driving train of gears 7, 8, 9. The gears 6 and 21 have identical circumferential speed and may be identical as to diameter and number of teeth; also the gear 15 may be any convenient diameter and number of teeth that will mesh with gears 6 and 21 in a manner to be described.

The said gear 21 I term the motion-maintaining gear because it maintains the motion exactly of the feed gear or gears 15 that has or have been moved out of feeding relation to the driven feed gear 6. The said gear 21 I also refer to as a receiving gear or non-feeding receiving gear, in that it receives in a meshing relation whatever gear 15 is at any time moved out of meshing relation with the gear 6. It maintains the motion of the gear or gears 15 at precisely the same circumferential speed that it had when it was in mesh with the driven gear 6. Though difficult to illustrate, unless the parts were shown upon an enlarged scale, it is pointed out that whereas in the construction shown in my co-pending application Ser. No. 281,547, it is impossible to feed the strand if the teeth of the two gears, such as 13 and 7 thereof, are fully separated, it is possible to feed and control the strand in the construction herein disclosed even though the teeth of the two gears 6 and 15 are slightly separated, inasmuch as the said gear 15 is or may be in mesh with the speed-maintaining gear 21. Desirably, however, and for carrying out the broad purpose of my invention, the gear 21 is so spaced from the gear 15 when the latter is in feeding position that when the gear 15 is moved into meshing relation with the gear 21, it is then out of feeding relation with the gear 6.

It is highly important that the gears of the entire set 6, 15, 21, be very delicately adjusted to prevent the tops of the teeth of opposing gears coming together, and so cutting the strand between them with hammer-like blows. In Fig. 5, the teeth of the gears 6 and 15 are properly shown as intermeshing so as to feed the strand A in a fluted, sinuous or wave-like manner, as diagrammatically indicated in Fig. 5.

It is also highly important that the teeth of the gear 21 may be so positioned with respect to the shaft 20 that the teeth of the gears 15 and 21 may intermesh properly. In order to secure this result, I provide suitable adjusting means and preferably the adjusting means, as shown most clearly in Figs. 2 and 8. As shown in said figures, the gear 21 is fast upon the shaft 20, being held fast thereon by set screw 22. The gear 9 is not itself directly made fast upon the shaft 20, but in this example of adjusting means I have provided a sleeve, collar or annular plate 23 made fast upon the shaft 20 by set screw 24. The said sleeve, collar or plate is provided with a circumferential flange 25, wherein are two somewhat elongated and slightly segmentally shaped slots 26 receiving screws 27, 27 that are tapped into threaded holes 28, 28 in the gear 9, which, as here shown, is separated by a bearing from the gear 21. It will be understood from the said disclosure that the gear 21 may be adjusted to any necessary extent in a circumferential direction by loosening screws 27 and turning the sleeve, collar or plate 23 which, being fast upon the shaft 20, turns said shaft to the same extent and therefore with it circumferentially adjusts the gear 21 to the desired extent. Thus the proper relation of the teeth of the gears 15 and 21 is arrived at. Any other suitable adjusting means for the purpose may be provided.

Each of the strand-receiving guide arms 18, if two or such other plurality thereof be employed as is desirable, is supported for movement to and fro consequent upon comparatively slight variations in the strand tension of the strand pertaining thereto, but with the capacity for greater movement in the event of strand discontinuance or strand breakage, or in the event of such excessive feed of the strands, or one of them, at the needles as would result in stoppage of the knitting mechanism.

While any suitable construction may be provided for the purpose, I have, as shown in Figs. 2, 5 and elsewhere, provided an arm or standard 29 extending upward from the bracket or casting 5. Upon the said arm or standard 29 is pivoted at 30 a cam member 31 for each strand, two such cam members therefore being shown in Fig. 7 and similarly indicated as 31. It will be observed that the functioning surface of each said cam member 31 is at a constantly increasing distance from the pivotal point 30 thereof, viewing said cam member as in Fig. 2. Each strand-receiving guide arm 18 is fixedly connected to the respective cam members 31, so that there are as many guiding arms 18 and cam members 31 as there are strands being fed to the knitting mechanism.

The upper end of each lever arm 12 is shown as provided with a roll 32 bearing lightly upon the cam surface of the corresponding cam member 31.

In the event of slight but not excessive changes in the strand-tension, and such as may normally very frequently occur, the corresponding guide arm 18, in the event that the change is a slight increase in the tension, is drawn slightly downward and the corresponding cam member 31 is correspondingly slightly rocked in a clockwise direction, viewing Fig. 2. Such slight clockwise movement causes a slight outward movement of the corresponding lever arm 13 of the lever 12, with corresponding slight inward movement of the lever arm 14 of said lever 12, thus moving the teeth of the corresponding wheel or rotary member 15 into deeper interengaging or meshing relation with the teeth of the gear or rotary member 6. This slightly increases the feed of the strand in question, and therefore relieves the undue tension.

In the event that said slight change in the tension of the strand is a diminution of tension, the corresponding arm 18 will move slightly upward and consequently the cam member 31 will move slightly in a contraclockwise direction viewing Figs. 2 and 5, with such consequent movement of the corresponding lever arms 13 and 14 of lever 12 as to withdraw the teeth of the gear or rotary member 15 slightly outward with respect to the teeth of the gear or rotary member 6. This will cause the slower feeding of the strand in question and so permit the corresponding arm 18 to resume its normal, level position.

This movement of any toothed gear or member 15 into deeper or less deep meshing relation with the toothed gear or member 6 is facilitated by the exceedingly sensitive pendulum-like mounting of each lever 12 at its pivot 12a.

Therefore, the said rotary members 6 and 15 with their teeth or tooth-like formations constitute a new or secondary or rectified source of supply in a condition of uniform tension of the strand or strands to the knitting machine or other mechanism where the strand or strands is or are to be used or accumulated, whereas the strand or strands between the original package, packages or supplies, such as spools or bobbins, is or may be in a condition of constantly though slowly changing tension, owing to numerous possible causes, such as imperfect winding upon the original package or packages, or the position of such package or packages as their strands are withdrawn therefrom. The strand or strands issue from the out-going side of the said rotary gears or members 6 and 15 in a condition of uniform tension and are delivered to the knitting machine or other mechanism in a condition of uniform tension.

Thus, there is provided by the said rotary gears or members 6 and 15 a source of supply which is a new, substitute or rectified source of supply and which is independent of the primary or original source of supply of the strand or strands, in that the substitute or rectified source of supply does not have the inequalities of tension of the original source of supply. Said substitute or rectified source of supply controls completely the tension of the strand or strands independently of the said original source or sources of supply, in that it is not affected by the inequalities of tension of the original supply, and those inequalities of tension of the original supply are not permitted at any time to impose themselves upon or to impair the uniform tension that exists between the outgoing side of the rotary gears or members 6, 15, and the knitting machine or other mechanism that receives the said strand or strands. Said rotary gears or members 5, 15 and the immediately cooperating parts create or provide such substitute or rectified source of supply which possesses the capacity to feed or not to feed the strand or strands as may be desired, without any mechanical connection between them and the knitting machine or other mechanism where the strand or strands is or are to be used.

Thus far the mechanism has been described as a means for correcting or compensating for or rectifying such slight irregularities as occur in the strand feed, this being accomplished by causing the strand or strands to take a more or less sinuous course between the teeth or tooth-like formations of the gears or rotary members 6, 15 pertaining to such strand or strands that are fed to the same point of the knitting machine.

In addition I provide any suitable means to stop the knitting or other mechanism in the event that a strand breaks or suddenly feeds at such an excessive rate due to the needles drawing longer loops or like cause, as to require stoppage of the mechanism until correction can be made. I may for this purpose provide any suitable stopping means and preferably or if desired one that is spaced from the take-up arm 18. For example, I may provide as a stopping means, a part or member onto which a strand, when breaking, would drop or against which it will move and so bring about the stopping of the knitting or other mechanism. Such means may be electrical or mechanical. For convenience, however, and not as a limitation, I have herein shown stopping means which is substantially the same as that shown in my co-pending application Ser. No. 281,547. This means is sufficiently shown in Figs. 2, 5, 9, 10, etc., wherein is indicated a snap-switch of the general construction shown in the patent to McGall, No. 1,960,020, May 22, 1934. The said switch indicated at 33, or other suitable device for the purpose, is supported by a bracket 34 extending from the upright or arm 29 centrally with respect to each cam member 31, if two cam members are employed in juxtaposition. A part of said switch 33 comprises a metallic spring strip 35 and a suitable contact 36. The said snap-switch 33 is wired as indicated generally at 37 to a solenoid or other mechanism or device, not illustrated, for stopping the knitting machine or other machine to which the strands are being fed.

Upon a lateral face of each cam member 31 is a laterally projecting pin 38, which is so positioned with respect to the metallic spring strip 35 that in whichever direction the corresponding cam member 31 swings excessively (that is, due to the strand breaking or suddenly feeding excessively and making longer knitting loops) the said pin 38 will depress the metallic spring strip 35 so as to cause it to touch the contact 36. These two movements, each resulting in causing the strip 35 to touch the contact 36, are respectively illustrated in Figs. 9 and 10. In Fig. 9, it will be observed that the pin 38 has moved over to the left of the pivotal point 30 of the cam member 31, whereas in Fig. 10 the said pin 38 has moved over to the right of the said pivot 30. In the movement shown in Fig. 9, the arm 18 has suddenly moved excessively upward due to strand breakage, whereas in Fig. 10 the arm 18 has suddenly been moved excessively downward, due to the strand being suddenly drawn into larger knitting loops through some cause. Either of these positions causes the spring strip 35 to be forced into touching relation with the contact 36 and so causes the stoppage of the knitting or other mechanism through suitable connections not herein necessary to illustrate.

Instead of the stopping mechanism here shown, any other suitable stopping means may be provided, as, for example, a device wherein upon the contingencies referred to, a part is let drop or is moved so as to stop the mechanism in a manner characteristic of knitting or weaving instrumentalities of an electrical or mechanical nature, where a part stops or swings downward or upward when the strand supported thereby is broken.

I provide means whereby any gear or rotary member 15 that is moved out of meshing relation with the teeth of the gear or rotary member 6 is steadied and is kept from a trembling or vibrating motion. The means provided also holds each roll 32 of a lever 12 against the surface of the corresponding cam member 31. This means is therefore in the nature of a lock, though its function is best described as that of holding, retaining or steadying the gear or gears 15, as well as the roll or rolls 32 when a gear 15 is out of meshing relation with the gear 6.

In this embodiment of my invention, I have represented the said means as a thin plate 40, which is secured by screws 41 against the face of the cam member 31, as best indicated in Figs. 2 and 5. The contour of the said plate 40 preferably but not necessarily follows that of the cam member 31 at the left hand part of said cam member viewing Figs. 2 and 5, but at its right hand part it extends substantially beyond the cam member 31, and is there provided with a slot 42, the mouth of which is widened as indicated at 43. The said slot 42, 43 receives at times a laterally extending pivot pin 44 for the roll 32. When the gear 15 is in mesh with the gear 6, as shown in Fig. 5, the said laterally extending pivot pin 44 is in the wide mouth 43 of said slot 42, and said slot has no effect thereon, but when the arm 18 has suddenly moved upward as indicated in Fig. 4, the position of the parts is such that the laterally extending pivot pin 44 of the roll 32 is engaged by the narrow part of the slot 42 with the result that all trembling or vibration of the roll 32, the lever 12 and the gear 15 is prevented, said gear 15 at such time being out of mesh with the teeth of the driven gear 6.

In addition to steadying means, one form of which has just been described, I provide means in the nature of a clamp for any strand that is out of action,—that is to say, is not at that time being fed to the needles of the knitting machine or to such other machine as may be receiving the strand or strands from the feeding gears 6, 15. I may also provide means for withdrawing a strand from the control of the meshing gears 6, 15. Such withdrawing means may be the same or substantially the same as is shown in Figs. 8, 9, 10 and 12 of my said co-pending application Ser. No. 281,547, where each cam member corresponding to the cam member 31 herein, has provided upon the side face a part to act upon a pivotally mounted yarn guide that is, in such case, substituted for the fixed yarn guide 16 herein shown, in that it is in such case pivotally mounted as shown in my said co-pending application, and when moved by the member on the face of the cam member 31, moves said pivoted yarn guide in such a way as to withdraw laterally the strand controlled thereby from between the teeth of the gear wheels 6, 15. Such movable yarn guide is desirably a lever of light wire pivoted upon the bracket 5 and having at its lower end an eye such as shown at 17 herein, through which the strand passes. Thus a strand may be withdrawn for any reason from between the teeth of the gears 6, 15, as, for example, for effecting horizontal striping in knitting, the said withdrawn strand to be thrown back whenever desired under the control of a suitable automatically acting part of the knitting mechanism and again withdrawn as the mechanism indicates. Such strand would also be withdrawn in the event it breaks from any cause.

When the withdrawn strand is to be reintroduced because of the requirements for horizontal striping, or for any other reason, the said movable guide causes the said strand to re-enter laterally between the teeth of the gears 6, 15.

It is to be understood that this feature of my invention is applicable not only to the lateral withdrawal of a broken strand, but also to a lateral withdrawal of an intact strand for any purpose, as, for example, to permit the feeding of another strand for horizontal striping in knitting, or to permit the knitting to continue with the remaining strand or strands, which would cause a horizontal striped condition, or it may be for the purpose of floating a thread or strand past some of the knitting needles, as in the knitting of a high splice, and then reintroducing the same strand after a longer or shorter time. Any of the said functions, purposes or actions set forth in the specification is a cessation of machine demand, the period of cessation depending, of course, upon the situation to which the particular function, purpose or action pertains.

Having sufficiently referred to the employment of means for withdrawing a strand laterally from the control of the meshing gears 6, 15, I will next describe in detail one embodiment of clamp for a withdrawn strand, already generally referred to, it being understood, however, that in place of a clamp, I may use a suitable tension means. The clamp, which may be of any suitable form or type, and which I preferably employ, is here indicated as a lever 45, best shown in Figs. 2 and 5 as pivoted upon a screw or stud 46 tapped into or received by the casting 5. The upper arm 47 of the lever 45 is longitudinally slotted as indicated at 48 and receives a laterally extending pin 49, which in this form of my invention is carried by the cam plate 40 that, as best shown in Fig. 7, is bent laterally outward and again forward, as indicated at 50, in order to clear the necessary parts, and to receive the corresponding pin 49. If the plate 40 is not provided, then the pin 49 is carried by the cam 31, as is the case in the second form of my invention shown in Figs. 11 to 19.

Figure 13:
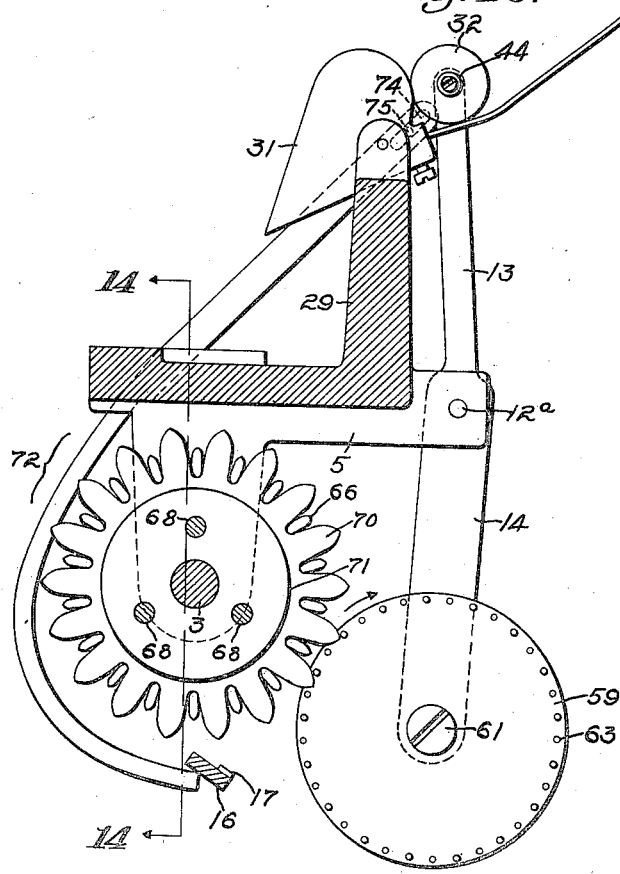
Fig. 13 is a view similar to Fig. 12, but partly in elevation, and showing the clamp as in position to confine a non-feeding strand.

The lower arm 51 of the lever 45 terminates at 52 in proximity to the guide arm 16. When the strand pertaining to a guide 16 is being fed, the said end 52 of the lever arm 51 does not clamp the strand against the guide 16, and this is the relation of parts shown in Figs. 2 and 5. When, however, a strand breaks or is discontinued or is withdrawn from action, the movement of the corresponding cam member 31 causes the pin 49 in the slot 48 so to move the lever 45 that the end 52 of said lever is caused to clamp the withdrawn, broken or discontinued strand. This clamping position is shown in Fig. 13 of the second form of my invention.

Any clamp for an inactive yarn may be employed by me, as, for example, any one of many types of yarn clamps for inactive yarns in knitting. A strand that is not being fed tends to sag or to be drawn laterally, and in fact is attracted by moving parts of the mechanism, and therefore a clamp is highly desirable for inactive strands.

It is to be understood that while an automatically-acting clamp is shown, I may use a manually operated clamp and the strand-withdrawing means may be automatic, as shown in Figs. 8 to 11 of my co-pending application Ser. No. 281,574, or it may be manual. In other words, either the clamp or the withdrawing means may be manually operated or automatically operated, and in using them in combination either may be manual in operation and the other may be automatic or manual.

I have provided what I term strand-storage or storing means for any strand or strands temporarily withdrawn from action or not being fed by the rotary members or gears 6, 15. Such storage means is preferably used in cases where it is undesirable to start pulling a strand from the package too fast. This is usually in cases where it is necessary to rotate the original source of supply, such as a spool or skein or bobbin. While any suitable means may be provided for this purpose, I have herein represented two series of horizontally positioned rods under and over which the strand or strands pass in loop form, or the same may pass between them in a straight path when the storage-means is not functioning as such. This construction is desirably used in connection with a clamping means to prevent overrunning of the said strand or strands, so that the said horizontal rods will not tend to draw new strand or strands from the original source or sources of supply, but will create a storage supply from the strand or strands already withdrawn from the original source of supply, such, for example, as the bobbin C shown in Fig. 5. Instead of clamping means, I may employ tension means for the same purpose.

The part of any strand that is thus stored may be any excessive part of such strand between the original supply and the toothed gears 6, 15. The said horizontally positioned rods are not intended as tensioning means but have the function of storing temporarily such portions of the withdrawn strands as can be positioned in loop form as indicated in dotted lines in Fig. 5, due to the fact they have been withdrawn.

In said Fig. 5, I have represented three stationarily mounted rods 53 suitably spaced, and above but between them two horizontal rods 54 supported for up and down movement in horizontal position, which rods in their full line position are represented as entirely above and out of contact with the strands and in their lower or dotted line position are shown as having drawn or moved the excess portion of the strands down into loop form. The said rods 54 are adapted, while horizontally positioned, to be moved automatically up and down to any suitable extent from and by any suitable driven part of the mechanism periodically, in order to establish the said storage supply, if opportunity therefor is presented by the condition of the strands. For example, the said rods 54 may be moved up and down while horizontal by suitable operating connections from the knitting mechanism or from the means that drives the gear wheel 6 pertaining to such strand or strands as travel between said set of rods 53, 54. The number of rods in the two groups 53, 54 may be varied as desired.

In the form of mechanism shown in Figs. 1 to 10, I have represented the toothed gear wheel 6 as of sufficient width to feed two strands, each being fed by the said gear wheel 6 and one of the gear wheels 15, two such gear wheels 15 being shown in the form of my invention disclosed in Figs. 1 to 10. In Fig. 3, it will be observed that the strand guide 16 is provided with two guide eyes 17, 17 for the two strands and in said Fig. 3 is shown the preferred manner of supporting the gear wheel 6 upon the shaft 3 and rendering it tight thereon by means of a suitable screw 55. In said Fig. 3, the said gear 6 is shown as received between spaced portions of the casting or bracket 5. The said casting is, as stated, supported in any suitable manner preferably upon some stationary part of the knitting machine, and in Figs. 1 and 6 I have represented an upright post 56 to which the bracket or casting 5 is secured by a bolt 57 or in any other suitable manner.

It is desirable that the gear 15 that meshes with the driven gear 6 be about one eighth or one quarter of an inch in width at its teeth as a minimum, but any desired width may be employed, and a greater width would be employed if two strands are fed thereby.

While, in Figs. 1 to 10, I have shown the unit as adapted to feed only two strands, I may provide a unit to feed any desired greater number, as, for example, as many as ten strands. Means for feeding such much larger number is disclosed in Fig. 20, wherein the single unit effects the feeding of ten different strands. This is accomplished by providing five gears like the gear 6, shown in Figs. 1 to 10, and ten gears like the gear 15. I also provide five speed-maintaining gears 21, all as indicated in said Fig. 20. The parts otherwise are preferably the same as in Figs. 1 to 10, the casting or bracket 5a of Fig. 20 being of such size and shape as to accommodate the five different sets or groups of gears all in the one unit, and all driven by a single driving band or rope 1. It is, therefore, unnecessary to describe in greater detail the construction shown in Fig. 5 otherwise than to state that a single set of gears 7, 8, 9 is employed for rotating the entire series of speed-maintaining gears 21.

I have stated that many different types or forms of gears may be employed within the scope and purpose of my invention, and it is manifestly unnecessary to illustrate them all. I have, however, in Figs. 11 to 19, shown a second type of gear for effecting the same purpose as that accomplished by the type of gear shown in Figs. 1 to 10, and it is to be understood that many other different types, all within the scope of my invention, may be employed.

In said Figs. 11 to 19, the general construction of parts is the same, and it is therefore unnecessary to describe the same parts again in detail. They are given the same reference numerals, and it is to be understood that the parts operate the same as do the same or like parts in the construction shown in Figs. 1 to 10.

I have, however, in the construction shown in Figs. 11 to 19, shown a different type of gearing, which type permits me to effect the continued rotation of the gear corresponding to the gear 15 of Figs. 1 to 10, without providing the outside or speed-maintaining gear 21, which is driven through the train of gears 7, 8 and 9, in Figs. 1 to 10 and 20. I will describe in detail how this is accomplished.

Figure 14:
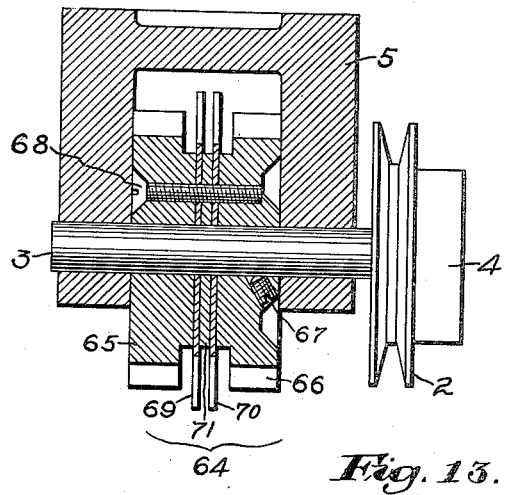
Fig. 14 is a vertical section upon the line 14—14 of Fig. 13.

Instead of employing a solid gear 15, as in the first form of my invention, I replace each gear 15 by a gear 58, best shown in Figs. 16 to 19. Each such gear 58 is, as there shown, composed of two thin disks 59, 60, supported for rotating movement upon a stud 61, shown as tapped at 62 into the lower arm 14 of the corresponding lever 12. In said Figs. 16 to 19, two such gears 58 are shown in side-by-side relation substantially as in the case of the gears 15. Fast in each pair of spaced disks 59, 60, is a circumferentially arranged series of pins 63 extending entirely about the said disks 59, 60 circumferentially and constituting with them a cage-like structure in which the pins 63 take the place of the teeth of the gears 15 and perform the same function, as will be evident from the sinuous or fluted course of the strand A, indicated in Fig. 15. The gear corresponding to the gear 6 of the first form of my invention is constructed, as best shown in Fig. 14, where a gear generally indicated at 64 is composed of a toothed gear member 65, and a second similar toothed gear member 66. The latter is held fast to the shaft 3 by a set screw 67, and the two gear members 65, 66 are held in fixed relation by a suitable number of transversely extending screws 68. The said structure is supported within the bracket or casting 5 in a manner generally similar to that shown in Fig. 3.

Between the said two gear members 65, 66 are positioned two thin wheels 69, 70 with prolonged teeth, somewhat resembling star wheels, and between them is a collar or washer 71. The parts 65 to 71, therefore, constitute a single rigid structure. It will be observed, viewing Fig. 14, that the prolonged teeth of the wheels 69, 70 extend radially outward to such an extent that when either cage-like gear 58 is moved in a pendulum-like manner to withdraw its pins 63 from toothed engagement with the teeth of the gear member 65 or 66, and therefore the strand A is no longer being fed by the intermeshing teeth, nevertheless the said withdrawn cage-like gear 58 is rotated at the same speed as before. This is because of the fact that, as shown in Figs. 16, 17 and 19, alternate pins 63 of each cage-like gear 58 are prolonged inwardly past the adjacent disks 59, 60, and are engaged by the radially prolonged teeth of the wheel 69 or 70, as the case may be. This is evident from the construction shown in Fig. 13 where the position of the clamping lever 72 is such that the strand out of action is clamped against the yarn guide 16.

In this form of my invention the clamping lever 72 is pivoted at 73, as shown in Fig. 15, upon the casting or bracket 5, and the upper end of said lever, which is slotted as indicated at 74, receives a pin 75 laterally extending from the cam 31. In this form of my invention, the plate 40 is not provided, and therefore the pin 75 is received directly upon the cam 31.

I have referred to the fact that because of the presence, in the disclosed embodiment of my invention, of the speed-maintaining gear or gears 21, it is possible to feed a strand or strands with the gears 6 and 15 out of, or almost or substantially out of contact and/or meshing relation. This is a very important circumstance and feature of my invention. Among other things, it enables me to obtain a controlled slippage of a strand or strands, and thus to feed a strand or strands at a much slower rate than as though the gear or gears 21 were not present. This is very important on some knitting machines, as, for example, automatic ribbers, where the yarn, thread or strand speed may vary as much as two to one, from time to time in the knitting of a single hose or article.

When mechanism such as herein disclosed is used for feeding two or any other plurality of strands, particularly to a knitting machine, I provide, in addition to the switch 33 to 36 for each individual strand, a second switch, preferably electrical in character, which is operated from or by the cam shaft of the knitting or other machine, as from a pattern chain or cam on said shaft, so that when a strand is purposely removed from the machine, as, for example, by said means acting automatically under control of the pattern mechanism of the machine, the arm 18 pertaining to the so removed strand may then move up as much as it will without stopping the machine, because of such movement of the arm 18 pertaining to the removed strand. Such second switch, which is preferably automatically operated from the cam shaft of the knitting machine, as from the pattern chain thereof, and therefore at a predetermined time or upon the occurrence of a predetermined event, acts to put the first stop motion for that strand out of action for so long as that strand is not being fed. This is accomplished by causing the said second switch to break the circuit represented by the numeral 37 leading from the first switch for that strand. Therefore, so long as the circuit is broken by the action of the said second switch, the first stop motion for that removed strand cannot operate to stop the machine. Nevertheless, the stop motions for each and every one of the other strands, however many there may be, and which remain in action, will act as described hereinbefore, and will serve to stop the machine in the event of accidental breakage of a strand or the unintentional withdrawal of a strand.

It is to be understood that the said second switch will act upon, and render inactive in the manner described, any first switch 33 to 38, the strand pertaining to which has been removed from action predeterminedly as described. That is to say, I may have three or more strands, and I may upon a predetermined occurrence cause the automatic withdrawal of any strand, and upon such withdrawal the first switch for the withdrawn strand is rendered inactive as described. This is all done automatically.

Having thus described two illustrative embodiments of the invention, it is to be understood that although specific terms are employed, they are used in a generic and descriptive sense and not for purposes of limitation, the scope of the invention being set forth in the following claims.

I claim:

1. Strand feed-controlling mechanism for textile and other machine comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and means for continuing the rotation of the co-acting feeding member or members during such period of non-feeding relation with the driven member or members.

2. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and means for continuing at the speed of the driven member or members the rotation of the co-acting feeding member or members when in non-feeding relation to the driven member or members.

3. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining gear or gears to engage the said co-acting feeding member or members when in non-feeding relation to the said driven member or members.

4. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining member or members driven at the same speed as the driven member or members and supported in position to engage and to rotate at such speed the co-acting feeding member or members when in non-feeding relation to the said driven member or members.

5. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining gear or gears driven from the shaft of the driven member, in the same direction and at the same speed as said driven member, and supported to engage and continue the rotation of the co-acting feeding member or members when separated from the said driven member or members.

6. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a train of motion-transmitting gears driven from the shaft of the driven member or members at the speed thereof, and so supported and positioned that a gear or gears of such train engages the co-acting feeding member or members when separated from the said driven member or members.

7. Strand feed-controlling mechanism for textile and other machines comprising in combination, a set of rotatable feeding members having interengageable toothlike formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining gear or gears to engage the said co-acting feeding member or members when in non-feeding relation to the said driven member or members, the said co-acting feeding member or members being supported for pendulum-like movement, delicately responsive to the stress of the strand or strands, toward and from the axis of the said driven member or members.

8. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining member or members driven at the same speed as the driven member or members, and supported in position to engage and to rotate at such speed the non-driven member or members when in co-acting feeding relation to the said driven member or members, the said co-acting feeding member or members being supported for pendulum-like movement, delicately responsive to the stress of the strand or strands, toward and from the axis of the said driven member or members.

9. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and a motion-maintaining gear or gears driven from the shaft of the driven member, in the same direction and at the same speed as said driven member, and supported to engage and continue the rotation of the co-acting feeding member or members when separated from the said driven member or members, the said co-acting feeding member or members being supported for pendulum-like movement, delicately responsive to the stress of the strand or strands, toward and from the axis of the said driven member or members.

10. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears to engage the said co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, and strand-guiding means delicately responsive to the stress of the feeding strand or strands and positioned to act upon such lever arm or arms above such pivot, thereby controlling the pendulum-like motion of said lever or levers.

11. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members, and supported in position to engage and to rotate at such speed the co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, and strand-guiding means delicately responsive to the stress of the feeding strand or strands and positioned to act upon such lever arm or arms above such pivot, thereby controlling the pendulum-like motion of said lever or levers.

12. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears driven from the shaft of the driven member, in the same direction and at the same speed as said driven member, and supported to engage and continue the rotation of the co-acting feeding member or members when separated from the said driven member or members, a lever or levers for respectively supporting the co-acting feeding member or members for pendulum-like movement toward and from the axis of the said driven member or members of said set, such lever or levers each having an arm extending above the pivotal point thereof, and strand-guiding means delicately responsive to the stress of the feeding strand or strands and positioned to act upon such lever arm or arms above such pivot, thereby controlling the pendulum-like motion of said lever or levers.

13. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and steadying means to prevent trembling or vibrating movement of the co-acting feeding member or members when in non-feeding relation to the said driven member or members.

14. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable member is interrupted by separation of said feeding members, and locking means for the co-acting feeding member or members when in non-feeding relation to the said driven member or members.

15. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears to engage the said co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, strand-guiding means delicately responsive to the stress of the feeding strand or strands and positioned to act upon such lever arm or arms above such pivot, thereby controlling the pendulum-like motion of said lever or levers, and steadying means positioned to act upon a lever when its co-acting feeding member is in non-feeding position, to prevent vibratory or trembling movement of such lever when in said non-feeding position.

16. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members, and supported in position to engage and to rotate at such speed the co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, strand-guiding means delicately responsive to the stress of the feeding strand or strands and positioned to act upon such lever arm or arms above such pivot, thereby controlling the pendulum-like motion of said lever or levers, and steadying means positioned to act upon a lever when its co-acting feeding member is in non-feeding position, to prevent vibratory or trembling movement of such lever when in said non-feeding position.

17. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears driven from the shaft of the driven member, in the same direction and at the same speed as said driven member, and supported to engage and continue the rotation of the co-acting feeding member or members when separated from the said driven member or members, a lever or levers for respectively supporting the co-acting feeding member or members for pendulum-like movement toward and from the axis of the said driven member or members of said set, such lever or levers each having an arm extending above the pivotal point thereof, strand-guiding means delicately responsive to the stress of the feeding strand or strands and positioned to act upon such lever arm or arms above such pivot, thereby controlling the pendulum-like motion of said lever or levers, and steadying means positioned to act upon a lever when its co-acting feeding member is in non-feeding position, to prevent vibratory or trembling movement of such lever when in said non-feeding position.

18. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for pretermined cause pertaining to strand feed, the feeding relation of said rotatable members is interrupted by separation of said feeding members, a motion-maintaining gear or gears to engage the said co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, strand-guiding means delicately responsive to the stress of such lever arm or arms above such pivot, thereby controlling the pendulum-like motion of said lever or levers, and steadying means positioned to act upon a lever when its co-acting feeding member is in non-feeding position, to prevent vibratory or trembling movement of such lever when in said non-feeding position, said steadying means including an element having a slot with a widened portion to receive a formation from the said lever, thereby steadying the said lever when its feeding member is in non-feeding position.

19. Strand feed-controlling mechanism for textile and other machines comprising in combination a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members, and supported in position to engage and to rotate at such speed the co-acting feeding member or members when in non-feeding relation to the said driven member or members, a lever or levers for respectively supporting the co-acting feeding member or members for pendulum-like movement toward and from the axis of the said driven member or members of said set, such lever or levers each having an arm extending above the pivotal point thereof, strand-guiding means delicately responsive to the stress of the feeding strand or strands and positioned to act upon such lever arm or arms above such pivot, thereby controlling the pendulum-like motion of said lever or levers, and steadying means positioned to act upon a lever when its co-acting feeding member is in non-feeding position, to prevent vibratory or trembling movement of such lever when in said non-feeding position, said steadying means including an element having a slot with a widened portion to receive a formation from the said lever, thereby steadying the said lever when its feeding member is in non-feeding position.

20. Strand feed-controlling mechanism for textile and other machines comprising in combination, a set of rotatable feeding members having interengageable tooth-like formations, for feeding a strand or strands between them, at least one of said members being driven, means whereby, for predetermined cause pertaining to strand feed, the feeding relation of said rotatable members is interrupted by complete separation of said feeding members, and means to hold or clamp an inactive strand which, when the said feeding members are in feeding relation, is being fed by said members.

21. Strand feed-controlling mechanism for textile and other machines comprising in combination, a set of rotatable feeding members having interengageable tooth-like formations, for feeding a strand or strands between them, at least one of said members being driven, means whereby, for predetermined cause pertaining to strand feed, the feeding relation of said rotatable members is interrupted by complete separation of said feeding members, and an automatically acting clamp to engage an inactive strand when its feeding is interrupted by such separation of feeding members.

22. Strand feed-controlling mechanism for textile and other machines comprising in combination, a set of rotary, toothed, interengaging members for feeding a strand or strands between them, at least one of said members being driven, a strand-receiving guide arm or arms supported for movement to and fro consequent on comparatively slight variations in strand tension, cooperating means for interrupting at intervals the feed of one or more of said strands between said members by entirely separating the feeding surfaces of said feeding members through movement of the related co-acting strand-receiving guide arm, thereby discontinuing the feed of such strand or strands, and means to hold or clamp such strand or strands.

23. Strand feed-controlling mechanism for textile and other machines comprising in combination, a set of rotary, toothed, interengaging members for feeding a strand or strands between them, at least one of said members being driven, a strand-receiving guide arm or arms supported for movement to and fro consequent on comparatively slight variations in strand tension, cooperating means for interrupting at intervals the feed of one or more of said strands between said members by entirely separating the feeding surfaces of said feeding members through movement of the related co-acting strand-receiving guide arm, thereby discontinuing the feed of such strand or strands, and an automatically acting clamp to engage a strand promptly upon such interruption of its feed.

24. Strand feed-controlling mechanism for textile and other machines, comprising in combination, a set of gears having intermeshing teeth constituting strand-feeding surfaces and which entirely control the feed of a strand or strands so long as the same is engaged by said intermeshing teeth, a plurality of strand-receiving guide arms supported for movement consequent upon comparatively slight variations in strand tension for effecting, without unmeshing said teeth, a change in the depth of mesh thereof, so that the strand or strands is or are constantly fed at a uniform tension while engaged by said teeth, whereby said mechanism feeds the strand or strands completely independent of any unevenness of tension in the strand or strands delivered from the original source of supply of said strand or strands, cooperating means for interrupting at intervals the feed of one or more of said strands between said gears, and means to hold or clamp such strand the feed whereof is interrupted, promptly upon such interruption of its feed.

25. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears to engage the said co-acting feeding member or members when in non-feeding relation to the said driven member or members, and means for circumferentially adjusting said motion-maintaining gear or gears to provide proper meshing relation to the teeth of the co-acting feeding member or members.

26. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining gear or gears to engage the said co-acting feeding member or members when in non-feeding relation to the said driven member or members, and means relatively to adjust in a circumferential direction the motion-maintaining gear or gears and the said co-acting feeding member or members, so as to provide proper meshing relation between the teeth thereof.

27. Strand feed-controlling mechanism for textile and other machines comprising in combination, a set of rotatable feeding members having interengageable tooth-like formation, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, and means for continuing at the speed of the driven member or members the rotation of the co-acting feeding member or members when in non-feeding relation to the driven member or members, said rotation-continuing means including a gear upon the shaft of the driven feeding member, said gear having sufficiently prolonged teeth to engage and continue the rotation of a co-acting feeding member when the latter is out of feeding relation to the driven feeding member.

28. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, means for continuing at the speed of the driven member or members the rotation of the co-acting feeding members or members when in non-feeding relation to the driven member or members, said rotation-continuing means including a plurality of gears with prolonged teeth fast upon the shaft of the driven feeding member, and respectively adapted to engage the teeth of and continue the rotation of a co-acting feeding member when out of feeding relation.

29. Strand feed-controlling mechanism for textile and other machines comprising in combination, a set of rotatable feeding members having interengageable tooth-like formations, for feeding a strand or strands between them, at least one of said members being driven, means whereby, for predetermined cause pertaining to strand feed, the feeding relation of said rotatable members is interrupted by separation of said feeding members, means to hold or clamp an inactive strand which, when the said feeding members are in feeding relation, is being fed by said members, and means to stop the rotation of the driven feeding member in the event of strand breakage by stopping the machine.

30. Strand feed-controlling mechanism for textile and other machines comprising in combination, a set of rotatable feeding members having interengageable tooth-like formations for feeding a strand or strands between them, at least one of said members being driven, means whereby, for predetermined cause pertaining to strand feed, the feeding relation of said rotatable members is interrupted by separation of said feeding members, an automatically acting clamp to engage an inactive strand when its feeding is interrupted by separation of feeding members, and means to stop the rotation of the driven feeding member in the event of strand breakage by stopping the machine.

31. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members and supported in position to engage and to rotate at such speed the co-acting feeding member or members when in non-feeding relation to the said driven member or members, said motion-maintaining gear or gears being supported adjacent an edge of the co-acting feeding member or members opposite to the driven feeding member, but spaced from the former when the co-acting feeding member or members are in feeding relation.

32. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members and supported in position to engage and to rotate at such speed the co-acting feeding member or members when in non-feeding relation to the said driven member or members, said motion-maintaining gear or gears being supported adjacent an edge of the co-acting feeding member or members opposite to the driven feeding member, but spaced from the former when the co-acting feeding member or members are in feeding relation, and means to rotate said motion-maintaining gear or gears at the same speed as the driven feeding member.

33. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members and supported in position to engage and to rotate at such speed the co-acting feeding member or members when in non-feeding relation to the said driven member or members, said motion-maintaining gear or gears being supported adjacent an edge of the co-acting feeding member or members opposite to the driven feeding member, but spaced from the former when the co-acting feeding member or members are in feeding relation, means to rotate said motion-maintaining gear or gears at the same speed as the driven feeding member, and means for supporting the said co-acting feeding member or members so that it may swing to and fro into meshing relation either with the driven feeding member or the motion-maintaining member or members as determined by strand conditions.

34. Strand feed-controlling mechanism for textile and other machines comprising in combination, a set of rotatable feeding members having interengageable tooth-like formations, for feeding a strand or strands between them, at least one of said members being driven and at least one other of said members being a co-acting feeding member, means whereby, for predetermined cause pertaining to strand feed, the feeding relation of said rotatable members is interrupted by separation of said feeding members, a motion-maintaining member or members driven at the same speed as the driven member or members and supported in position to engage and to rotate at such speed the co-acting feeding member or members when in non-feeding relation to the said driven member or members, said motion-maintaining gear or gears being supported adjacent an edge of the co-acting feeding member or members opposite to the driven feeding member, but spaced from the former when the co-acting feeding member or members are in feeding relation, means to rotate said motion-maintaining gear or gears at the same speed as the driven feeding member, and means for supporting the said co-acting feeding member or members so that it may swing to and fro into meshing relation either with the driven feeding member or the motion-maintaining member or members as determined by strand conditions, said supporting means including a lever or levers, the pivot whereof is directly above said co-acting feeding member or members, to provide a pendulum-like support.

35. Strand feed-controlling mechanism for textile and other machines comprising in combination, a set of rotatable feeding members having interengageable tooth-like formations for feeding a strand or strands between them, at least one of said members being driven, means whereby for predetermined cause pertaining to strand feed, the feeding relation of said rotatable members is changed by movement of one of said feeding members almost but not quite out of mesh with the driving member, so that a controlled-slippage of the strand that feeds between the said two members is afforded, and a motion-maintaining member driven at the same speed as the driven member and supported in position to engage and to rotate at such speed the said movable member substantially instantly upon the said movable member moving entirely out of feeding relation to the said driven member, whereby the speed of feed of any desired yarn may be varied.

36. Strand feed-controlling mechanism for textile and other machines, comprising in combination, a set of rotatable feeding members having interengageable, tooth-like formations for feeding a strand or strands between them, at least one of said members being driven, means whereby, for predetermined cause pertaining to strand feed, the feeding relation of said rotatable member is predeterminedly changed by movement of one of said feeding members almost but not quite out of mesh with the driving member, so that a controlled-slippage of the strand that feeds between the said two members is afforded, and a motion-maintaining member driven at the same speed as the driven member and supported in position to engage and to rotate at such speed the said movable member substantially instantly upon the said movable member moving entirely out of feeding relation to the said driven member, whereby the speed of feed of any desired yarn may be varied.

37. Strand feed-controlling mechanism for textile or other machines comprising, in combination, a set of rotatable, feeding members having interengageable, tooth-like formations for feeding the strand or strands between them, at least one of said members being driven while such machine is being driven, and means wholly controlled by the machine demand upon said strand or strands for accordingly varying the meshing relation of said members and for separating said members upon cessation of machine demand so as to stop the feed.

38. Strand feed-controlling mechanism for textile or other machines comprising, in combination, a set of rotatable, feeding members having interengageable, tooth-like formations for feeding the strand or strands between them, at least one of said members being driven while such machine is being driven, and means controlled by cessation of machine demand upon said strand or strands to separate said members and thereby interrupt the feeding of the strand or strands for the period of such cessation.

39. Strand feed-controlling mechanism for textile or other machines comprising, in combination, a set of rotatable, feeding members having interengageable, tooth-like formations for feeding the strand or strands between them, at least one of said members being driven while such machine is being driven, means controlled by cessation of machine demand upon said strand or strands to separate said members, and thereby interrupt the feeding of the strand or strands for the period of such cessation, and means whereby immediately upon restoration of machine demand the meshing relation of said members is restored without impairment of the strand in so restoring said meshing relation.

40. Strand feed-controlling mechanism for textile or other machine comprising, in combination, a set of rotary, toothed-interengaging members for feeding a strand or strands between them in accordance with the machine demand, at least one of said members being driven while such machine is being driven, and means whereby the machine demand for the strand or strands varies the rate of feed of said strand or strands by varying the mesh of said teeth, and the cessation of the machine demand stops said feed by entirely unmeshing said teeth, all by movement of at least one of said members toward and from another of the set.

41. Strand feed-controlling mechanism for textile or other machines comprising, in combination, a set of rotary, toothed, interengaging members for feeding a strand or strands between them in accordance with the machine demand, at least one of said members being driven while such machine is being driven, and means to vary and also to stop the feeding by said members of the strand or strands, wholly by relative movement of said members toward and from each other, to effect their meshing relation.

42. Strand feed-controlling mechanism for textile or other machines comprising in combination, a set of rotary, toothed, interengaging members for feeding a strand or strands between them in accordance with the machine demand, at least one of said members being driven while such machine is being driven, and means to lessen the rate of feed by lessening the extent of mesh of the teeth of said members and to stop the feed by completely separating said teeth.

43. Strand feed-controlling mechanism for textile or other machines comprising, in combination, a set of rotary, toothed, interengaging members for feeding a strand or strands between them in accordance with the machine demand, at least one of said members being driven while such machine is being driven, means to lessen the rate of feed by lessening the extent of mesh of the teeth of said members and to stop the feed by completely separating said teeth, and means to maintain the rotation of said members when their teeth are completely separated.

44. Strand feed-controlling mechanism for textile or other machines comprising, in combination, a set of rotary, toothed, interengaging members for feeding a strand or strands between them in accordance with the machine demand, at least one of said members being driven while such machine is being driven, and means wholly under the control of the strand or strands to move at least one of said members to position them in deeper or shallower mesh, and also wholly out of meshing relation, thereby to vary the rate of feed and to cause the cessation of the feed thereof.

45. Strand feed-controlling mechanism for textile and other machines comprising, in combination, a set of rotatable feeding members having interengageable, tooth-like formations for feeding a strand or strands between them, at least one of said members being driven while such machine is being driven, said members being relatively movable toward and from each other in accordance with and controlled by the machine demand for said strand or strands, said members being within the scope of such movement relatively positionable to permit controlled slippage of said strand or strands between them upon almost but not quite complete separation of said tooth-like formations, and means responsive to said machine demand to effect such movement.

46. Strand feed-controlling mechanism for textile and other machines comprising, in combination, a set of rotatable feeding members having interengageable, tooth-like formations for feeding a strand or strands between them, at least one of said members being driven while such machine is being driven, said members being relatively movable in a direction away from each other to an extent so very slightly short of complete separation as to provide a controlled slippage of the feeding strand, and means responsive to the machine demand to effect such movement.

ROBERT H. LAWSON.